Figure 1:
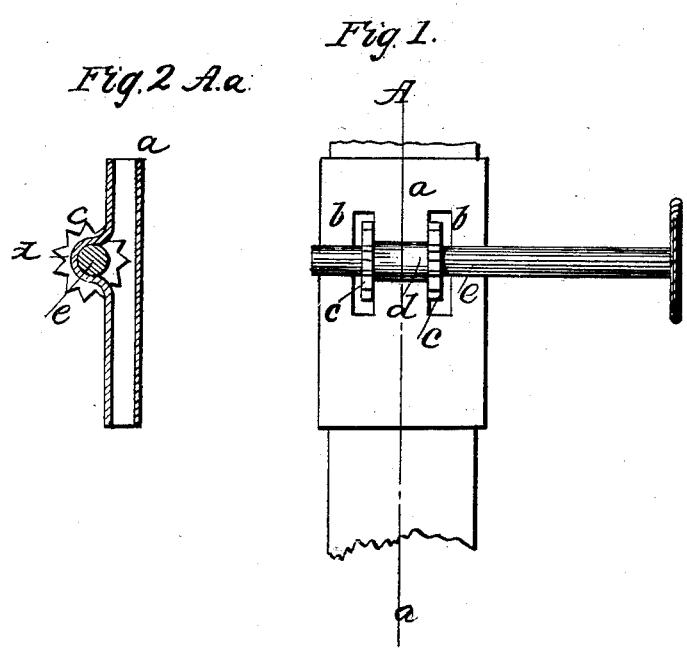

H. W. HAYDEN.
Wick Tube for Lamps.

No. 38,079.

Patented March 31, 1863.

Fig. 2 A.a

Witnesses

Inventor

UNITED STATES PATENT OFFICE.

HIRAM W. HAYDEN, OF WATERBURY, CONNECTICUT, ASSIGNOR TO HOLMES, BOOTH & HAYDENS, OF SAME PLACE.

IMPROVEMENT IN WICK-TUBES FOR LAMPS.

Specification forming part of Letters Patent No. 38,079, dated March 31, 1863.

*To all whom it may concern:*

Be it known that I, HIRAM W. HAYDEN, of Waterbury, in the State of Connecticut, have invented a certain new and useful Improvement in Wick-Tubes for Lamps; and I do hereby declare that the following is a full, clear, and exact description thereof, reference being had to the accompanying drawings, making part of this specification, in which—

Figure 1 is an elevation of a wick-tube on my improved plan; and Figure 2, a cross vertical section thereof, taken at the line A $a$ of Fig. 1.

The same letters indicate like parts in both figures.

My said invention relates to the method of forming the bearings in flat wick-tubes for the shaft of the spur-wheels, by which the wick is elevated or depressed. I take a metal tube, $a$, of the required size, and cut through one face of it two parallel slots, $b\ b$, in which the two spur-wheels $c\ c$ work, and by means of suitable tools raise the metal of the tube at $d$ between the two slots, and extending the whole width so as to form a semi-cylindrical projection. The spur-wheels $c\ c$ are then held in place in the slots $b\ b$, and the shaft $e$ is then driven into the eye of the wheels and under the projection $d$. The shaft is thus held in place, the outer surface of the tube outside of the slots $b\ b$ and the inner surface of the projection $d$ between the slots forming the bearings for it to turn in. The outer end of the shaft is to be provided in the usual manner with a rosette or thumb-and-finger wheel.

What I claim as my invention, and desire to secure by Letters Patent, is—

Forming the bearing or support for the shaft of the wick-wheels to turn in by stretching and bending out the metal of the tube between the slots in which the wick-wheels work, so as to embrace the shaft between such bent and stretched portion and the outer flat surface of the wick-tube outside of the slots, substantially as and for the purpose specified.

H. W. HAYDEN.

Witnesses:
NORTON J. BUEL,
THEODORE S. BUEL.